(12) United States Patent
Banerjee

(10) Patent No.: US 6,424,671 B1
(45) Date of Patent: Jul. 23, 2002

(54) PROCESS FOR MAKING STEEL

(75) Inventor: Shilowbhadra Banerjee, Maharashtra (IN)

(73) Assignee: National Research Development Corporation, New Delhi (IN)

( * ) Notice: Subject to any disclaimer, the term of this patent is extended or adjusted under 35 U.S.C. 154(b) by 0 days.

(21) Appl. No.: 09/673,131
(22) PCT Filed: Feb. 11, 1999
(86) PCT No.: PCT/IN99/00003
§ 371 (c)(1), (2), (4) Date: Dec. 5, 2000
(87) PCT Pub. No.: WO00/47782
PCT Pub. Date: Aug. 17, 2000

(51) Int. Cl.[7] .............................. F27D 17/00; H05B 7/22
(52) U.S. Cl. .............................. 373/9; 373/66; 75/10.34
(58) Field of Search .............................. 373/1, 2, 9, 42, 373/60, 66; 75/10.34, 10.36, 10.37, 10.48, 10.5, 10.58, 523, 528, 529, 538, 542, 958; 266/225

(56) References Cited

U.S. PATENT DOCUMENTS 4,105,439 A  * 8/1978 Barnes .......................... 75/51
4,329,171 A  * 5/1982 Robert .......................... 75/51
5,218,617 A  * 6/1993 Herrera-Garcia et al. .. 75/10.66
5,350,434 A     9/1994 Rollinger ................... 75/10.63

FOREIGN PATENT DOCUMENTS

| GB | 828376 | 2/1960 |
| GB | 943796 | 12/1963 |

* cited by examiner

Primary Examiner—Tu Ba Hoang
(74) Attorney, Agent, or Firm—Venable; George H. Spencer; Ashley J. Wells

(57) ABSTRACT

A process for making steel in an electric arc furnace includes providing a molten charge which is a melt composed of a high carbon ferrous metal in the electric arc furnace by one of preparing the melt in the furnace or introducing the melt into the furnace, the high carbon ferrous metal being composed of less than 3% carbon, less than 0.2% silicon, and less than 0.2% manganese, and the melt having a temperature of at least 1375° C.; adding to the molten charge provided in the furnace a solid metallic charge composed of least one material selected from the group consisting of scrap steel, hot briquetted iron, direct reduced iron, and iron ore to provide a charge mixture; refining the charge mixture by melting in the absence of gaseous oxygen to provide a molten steel; and superheating, finishing and tapping the molten steel into a ladle for subsequent casting thereof.

17 Claims, 1 Drawing Sheet

PROCESS FOR MAKING STEEL

BACKGROUND OF THE INVENTION

1. Field of the Invention

The present invention relates to an improved process for making steel in an electric arc furnace (EAF), which uses molten high carbon ferrous metal as a part of the EAF charge mix. The invention particularly relates to an improved process for steel making in an EAF and for making molten high carbon ferrous metal, either in a cupola or in a blast furnace or in other units which are used for making high carbon ferrous metal.

2. Description of the Related Art

One can classify the EAF steel making processes used in the prior art into two types: referred to hereinafter as Type I and Type II. In the Type I EAF steel making process, only solid charge is used such as: steel scrap (scrap): hot briquetted iron (HBI): direct reduced iron (DRI) which could be sponge, pellets, etc. and in some instances, solid pig iron or pig iron jam-as the EAF's metallic raw material. Such an EAF process and operation, incorporate the usual complements of the currently known developments in the EAF process technology, including the foamy slag practice. Type I is the traditional EAF steel making process.

The Type II EAF steel making process is a relatively new development. This process is replacing the Type I process. The Type II process uses a liquid charge which is either molten hot metal obtained from a blast furnace or a COREX furnace or molten cast iron metal from a cupola (all the molten high carbon ferrous metals obtained from these three or other similar sources, are hereinafter referred to as 'hot metal'—as one part of the raw material. Whereas the other part of the raw material consists of a solid charge, such as scrap; DRI; HBI; etc. In the Type II EAF process, a foamy slag is produced and maintained by the addition of oxygen and carburiser, as is done in the Type I process.

When compared to the steel making process of Type I, the use of the Type II EAF steel making process results in increased productivity and decreased power consumption in the EAF.

However, the steel making process of Type II also has following five major limitations when assessed all by itself.

First, it uses a considerable amount of gaseous oxygen to remove carbon, silicon and manganese from the molten hot metal and also to maintain a high oxygen potential to achieve phosphorous removal. The addition of a large quantity of gaseous oxygen, in turn, requires a large amount of carburiser so that a foamy slag can then be produced.

Second, the process uses a hot metal of conventional chemistry, that is, with carbon higher than 3%, with silicon usually higher than 0.4% and with manganese usually higher than 0.3%. Such a hot metal is usually prepared in a cupola or in a BF or in a similar unit. But the removal of higher levels of carbon, silicon and manganese requires additional oxygen, energy, time, fluxes and other consumables, during the steel making in the EAF. This is not only a wastage of the metalloids and alloying elements, such as carbon, silicon and manganese, but results in needless waste generation and corresponding loss of iron into the slag as iron oxide. But even more significant is the fact that the presence of higher levels of silicon and manganese dissolved in the molten ferrous metal delays the onset of carbon boil. This results in slower heat transfer from the electric arc to the metal to be melted. This delays melting and consumes additional energy.

Thus, in this process, the solid charge, such as, scrap, HBI, DRI, etc., is first melted after which the hot metal is poured into the EAF. This requires that an arc be produced to generate the heat required to melt the solid charge. This, in turn, results not only in higher electrode consumption but also prevents accelerated heat transfer from the arc to the solid charge as required for melting. Because, a major part of the heat transfer to the metallic charge in such instances occurs by radiation and conduction, at first from the arc to the slag layer and subsequently only by conduction from the slag to the metallic charge after the charge is partly melted and the slag forms. The slag is a poor conductor of heat and so is the solid metallic charge when it is added inside the EAF hearth since the charge gets automatically piled up with a considerable amount of void space in it. Therefore, the heat transfer, both through the slag and through the piled up metallic charge is relatively slow, resulting in a poor utilization of electrical energy to generate heat for melting the solid charge.

Fourth, DRI, if used, has to be of a high quality, that is, high in metallic iron and low in oxygen which is present in the DRI as iron oxide. Such a DRI is more highly priced.

Finally, the large quantity of silicon and manganese in the hot metal and higher oxygen potential used produce larger volumes of the oxides of silicon, manganese and iron. This in turn produces a larger slag volume requiring a larger quantity of flux to maintain a given level of basicity and a correspondingly larger loss of iron as oxide into the slag.

The main object of the present invention is to propose an improved process for EAF steel making without the use of gaseous oxygen and under an oxygen potential which is relatively low, so that the losses of iron and alloying elements are minimal.

Yet another object of the present invention is to propose an improved process for EAF steel making which uses resistive heating of the slag phase so that, consequently, the harmonics and resonance generated in the electrical circuit during arcing are significantly reduced, the sophisticated electrical circuitry currently used to maintain a stable arc is avoided, the power factor improves and electrical energy consumption decreases, the electrode consumption is less, electrode breakage is less, heat is generated mainly in the slag phase, and heat transfer is more effective producing an accelerated heating-melting-refining and, consequently, a decreased power consumption.

A further object of the present invention is to propose an improved process for EAF steel making with significantly decreased consumption of power, fluxes and other consumables.

Still a further object of the present invention is to propose an improved process of EAF steel making with the sequence of charging and the proportion of the charge mix (which consists of molten high carbon ferrous metal, scrap, HBI and DRI) in the EAF, so arranged and selected and also the chemistry of hot metal so adjusted, that the carbon boil starts as soon as the solid charge starts melting and the carbon boil continues just as long as the melting-refining continues, and that the carbon boil occurs and produces turbulence in the entire volume of molten metal bath, instead of being localized only at the slag/metal interface, and thereby producing very efficient heat transfer between the source of heat in the EAF and the entire molten metal bath, and also accelerates carbon removal.

Yet a further object of the present invention is to propose an improved process of EAF steel making with the slag basicity at a level higher than that conventionally used in most EAF steel making processes, but without significant increase in the consumption of flux.

Yet another object of the present invention is to produce from a cupola, the molten high carbon ferrous metal of a chemistry which not only facilitates steel making in the EAF but also facilitates the production of this metal from a cupola (or even from a blast furnace or any other furnace which produce such metal) and requires less expensive raw material, no ferroalloy addition and a lower consumption of coke.

SUMMARY OF THE INVENTION

According to this invention, there is provided an improved process for making steel in an electric arc furnace (EAF) using molten high carbon ferrous metal as a part of the EAF charge mix, which comprises;

a) preparing in/or introducing a molten high carbon ferrous metal (hot metal) into an EAF, said molten high carbon ferrous metal having a carbon content of less than 3% and a silicon and manganese content of less than 0.2% each, and a temperature of 1375° C. or high in the furnace;

b) adding a solid metallic charge selected from scrap, HBI, DRI (sponge, pellet, etc.) or iron ore present singularly or in any combination together with lime into the hot metal inside the EAF;

c) melting-cum-refining of the entire EAF charge mix in the absence of gaseous oxygen for carrying out said step of melting-cum-refining;

d) superheating, finishing and tapping the molten steel into the ladle, for its subsequent casting.

BRIEF DESCRIPTION OF THE DRAWING

The sole drawing FIGURE.

DESCRIPTION OF THE PREFERRED EMBODIMENTS

Figure 1:
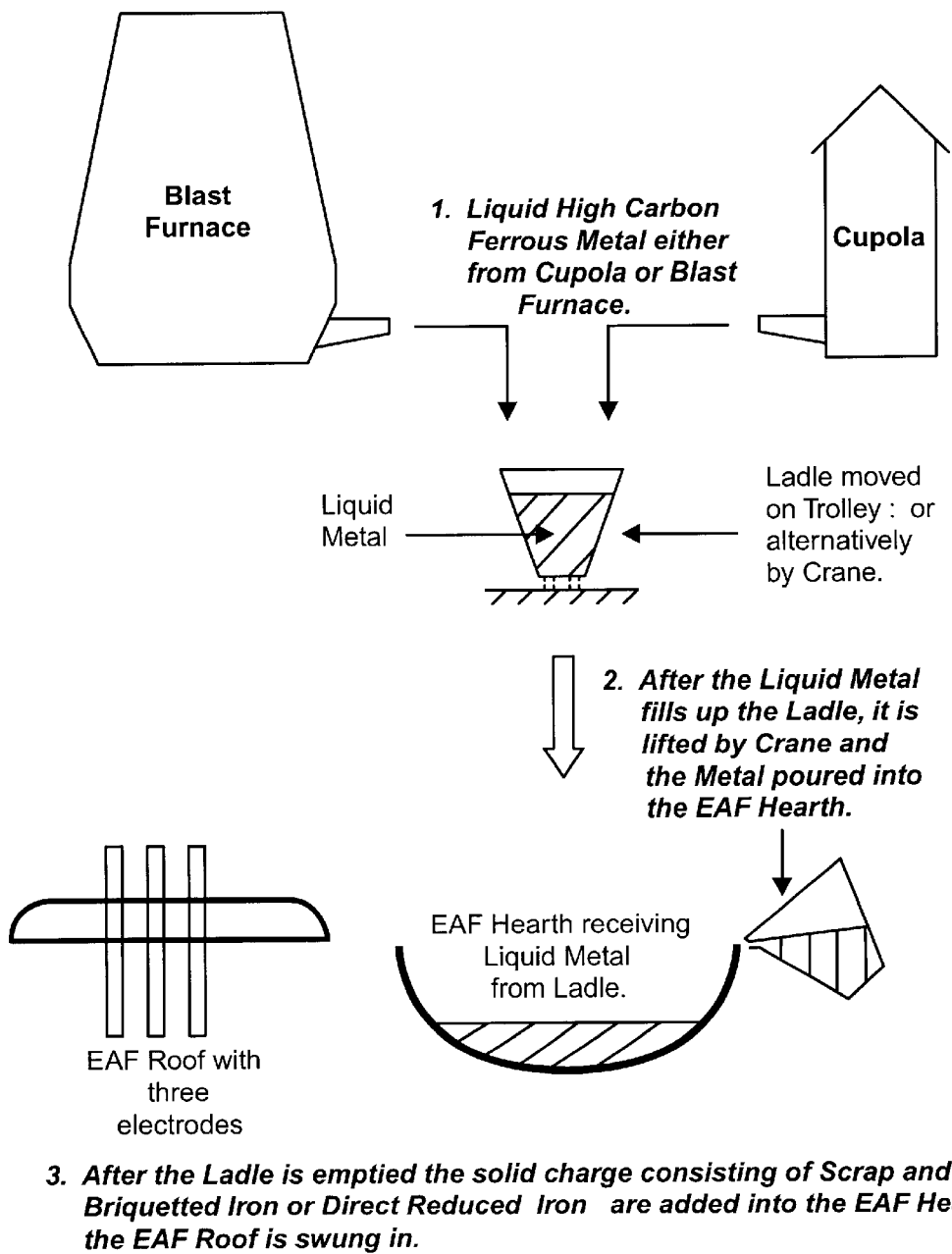
FIG. 1, schematically shows the transfer of a melt from a cupola and/or a blast furnace into a ladle, followed by transfer from the ladle into an electric arc furnace.

In accordance with the process of the present invention, the steel is made in an EAF which comprises pouring into the EAF the liquid charge consisting of the molten high carbon metal of a given chemistry, obtained from a cupola (or a blast furnace or a similar unit), and adding thereafter into the EAF the solid charge consisting of scrap, HBI, DRI, etc. The proportion of the liquid and the solid charge in the EAF charge mix is adjusted so that the oxygen available as iron oxide in the entire charge mix and as available by ingress of air into the furnace is sufficient to oxidize carbon, silicon and manganese, as required. Since the silicon and manganese level dissolved in the liquid charge, that is, the molten iron, is kept deliberately very low in the present invention, the carbon boil starts soon after the DRI or HBI is added and occurs throughout the bath of the molten metal. This rapidly transfers heat from the source to the molten bath right at the start of melting and also produces turbulence in it, which mixes and also melts the solid charge submerged into the molten bath, at a highly accelerated rate. In addition, the carbon boil can automatically promote the continued formation of a foamy slag (without having to add any oxygen or carburiser), provided the slag composition is adjusted through an appropriate addition of flux.

The molten high carbon ferrous metal of a given chemistry is preferably obtained from a cupola. However, the molten carbon ferrous metal may also be obtained from, for example, a BF or similar unit or prepared in the EAF itself.

A distinct advantage ensuring by the process of this investigation is that HBI or DRI of inferior quality such as with low metallic or in an oxidized or burnt condition or in a fine form may be added in the EAF with a very high resultant recovery of all the iron present in the charge material. The coarser fraction of such material can be mixed with the raw material in the cupola or in the BF with significant advantage in some instances.

In this process, the cupola mainly uses metallic raw materials, such as scrap and/or HBI and/or DRI; and no or only a small quantity of ferroalloy is added. Also, the cupola is run with a low coke rate, in order to produce a molten high carbon ferrous metal which has carbon, silicon and manganese amounts which are lower than those in the molten cast iron which is conventionally produced in a cupola. The BF or other similar units, if used, can be run to produce a low carbon, low silicon, low manganese hot metal with lower coke rate and a decreased quantity of quartzite or manganese ore in the charge.

In accordance with the present invention, the carbon content in the molten high carbon ferrous metal (a) is less than 3%, such as between 2 to 3%. Further, the level of silicon and manganese content in the molten high cartoon ferrous metal is each less than 0.2%.

The molten high carbon ferrous metal temperature is preferably at 1425° C. or higher, while the metal is tapped from either cupola or a blast furnace or from any other furnace which can produce such a molten high carbon ferrous metal.

The low phosphorous, low ash coke used together with metallic raw materials, such as scrap and/or HBI and/or DRI (sponge, pellet, etc.) and/or pig iron, is the charge in the cupola.

The present invention envisages a coke rate lower than that used for making conventional molten cast iron in a cupola, so that the hot metal of desired chemistry (with carbon typically less than 3% and silicon and manganese each less 0.2%) can be conveniently produced.

The coke rate and the constituent of the metallic charge used in the cupola are changed whenever required, to change the carbon content of the hot metal to a pre-selected level. Correspondingly, the proportion of hot metal in the EAF charge mix is selected such that the oxygen present as iron oxide, in the entire EAF-charge mix and in the ingress of air into the furnace, is sufficient to oxidize the carbon present in the charge as required.

The hot metal of a modified chemistry (with carbon typically less than 3% and silicon and manganese typically less than 0.2% each) is added into the EAF, either through its door using a "tundish attached with a runner" or from the top of the EAF after its roof is swung out, in which case a small quantity of solid charge (around 5 to 10%) is placed at the bottom of the EAF to break the fall of the liquid metal so that splashing of the liquid metal and erosion of the EAF bottom are prevented.

The charging sequence (a&b) and the quantity, chemistry and constituent of the hot metal (a) and solid charge (b) in the entire EAF charge mix, are so adjusted that carbon monoxide is generated throughout the entire volume of molten high carbon ferrous metal bath and during the entire period of melting refining, in order to promote efficient treat transfer and thereby accomplish accelerated melting and refining.

The solid metallic charge (b) and also lime (b) is added either from the top of the EAF with the help of a charging bucket which releases the charge into the EAF or, alternatively, the solid metallic charge and the lime are added through a conveyer charger or manually through the door.

The quantity and the proportion of the different constituents of the solid metallic charge (b) including DRI, HBI of low metallization or in an oxidized or limit condition, or in a fine form or, alternatively, the metallic charge may contain iron ore, are added into the EAF and are so adjusted that the oxygen present in the form of iron oxide and from the ingress of air into the furnace is sufficient to oxidize the carbon, as required in the entire EAF charge mix.

The oxygen potential during the melting-cum-refining (d) and superheating and finishing (e), is kept deliberately low by not using gaseous oxygen and yet at the same time achieving accelerated carbon removal, by generating carbon monoxide throughout the entire volume of the molten high carbon ferrous metal bath and during the entire period of melting-refining.

Arcing is kept to a minimum while converting the electrical energy into heat, and the chemistry and volume of the slag during the melting-cum-refining (d) and superheating and finishing (e) are so adjusted that the bulk of the heating is provided by resistive heating of the slag.

The process of the present invention is described herein below with reference to an example which is illustrative only and should not be construed to limit the scope of the invention in any manner.

EXAMPLE

Metallic raw material consisting of scrap (60%), HBI (20%), DR1 pellets (10%) and pig iron (10%), were added in a cupola. The coke used in the cupola had 12% ash and less than 0.05% P. The coke rate of the cupola was in the ratio of 1:6 of the coke to the metallic raw material. The cupola was run with a blowing rate adequate to produce molten high carbon ferrous material (hot metal) with carbon 2.9%, silicon 0.2%. and manganese 0.1%. The hot metal was tapped at a temperature of 1425° C. from the cupola into a preheated ladle. The hot metal tapped amounted to about 40% of the entire charge mix (consisting of both hot metal and solid charge) of the EAF.

The ladle containing the hot metal was quickly transferred to the EAF site. The roof of the EAF was lifted and swung out. Thereafter, the entire quantity of the hot metal was poured from the ladle into the EAF. Soon after this, a charging bucket containing the solid charge and lime was discharged into the EAF. The solid charge consisted of about 15% scrap and 85% DRI pellet which together constituted 60% of the entire charge mix of the EAF. The lime amounted to 5% of the entire charge mix. The DRI had an oxygen content of 3.6% in the form of iron oxide. Thereafter, the roof was swung in and seated on the EAF.

Full power was switched on to the EAF. The melting-refining and superheating was accomplished within 45 minutes. No oxygen or carbon was added but a foamy slag formed and a significant part of the slag overflowed towards the end of the heating. The opening carbon was at the desired level of 0.18%. The FeO content of the slag was 4.8%. The steel was deoxidized by adding silico-manganese and aluminum.

Ferro-manganese and ferro-chrome were added to adjust the steel composition. Thereafter, the steel prepared was tapped into the ladle for its subsequent casting.

The present invention has the following advantages:

1. A significant increase in EAF productivity, 20 to 30% more than that achieved in the hitherto known EAF steel making processes, which use hot metal as a part of the EAF charge mix.

2. The increased production from an EAF can be accomplished with a small investment (less than a tenth of the investment required in a BF of matching production level) since the invention requires molten high carbon ferrous metal with varying carbon level and low manganese and silicon levels, which is more conveniently delivered by a highly flexible unit such as a cupola. The fact that the cupola is semi-continuous, like the EAF, and therefore conveniently matches its operator-maintenance sequence. It is also inexpensive and less complicated to run which are its added advantages.

3. Significant decreases in the consumption of power (about 20%), in the amounts of ferroalloys fluxes and other consumables (which range from 10 to 100%), and a considerable decrease in the loss of iron (about 1%) and other elements, and significant increase in yield (about 2%) when compared to those achieved in the hitherto known EAF steel making processes which use hot metal as a part of the EAF charge mix.

4. DRI or HBI of inferior quality (in highly oxidized, burnt or fine form) can be used as the metallic charge in the EAF with very high resultant recovery of almost all the iron (>98%) present (including that in the form of oxide) in the charge material, thus producing a very high yield. Also, such DRI or HBI are inexpensive and are avoided in the conventional EAF steel making.

5. Gases such as hydrogen, nitrogen and oxygen in the finished steel are generally lower, since the carbon boil is prolonged and also it occurs throughout the entire volume of molten bath; the oxygen potential at which the steel is made is lower; and since the electrical resistive heating of the slag, rather than arcing, converts the electrical energy into heat to accomplish the melting-refining of the steel.

6. The levels of tramps and residuals in the steel made using this process could be 20 to 90% lower than steel made using scrap; lower since the process permits use of 100% HBI and DRI-about half of it in the cupola and the other half in the EAF.

The process of the present invention is similar to the Type II steel making process of the known art only in as much as the present invention uses high carbon molten iron as a liquid charge as a part of the EAF charge mix. But the present invention differs both from the Type I and Type II In the following six respects:

a) In the process of the present invention, no gaseous oxygen and, therefore, no carburiser is used in the steel making process, unless one has to correct the error in achieving a given carbon level in a steel as revealed in the opening sample, that is, towards the final stage of making the steel.

b) In the present invention, the hot metal used has a special chemistry for the levels of carbon, manganese and silicon, which are maintained deliberately lower than those in the hot metal that is conventionally produced from a cupola, BF, etc.

c) Unlike in the Type II process, in the process of the present invention, the molten high carbon ferrous metal is first added into the EAF and only thereafter the major part of the scrap, HBI, DRI, etc. are added into the molten bath.

d) DRI of low metallization and higher oxygen level and also of finer size can be advantageously used in the process of the present invention, not merely because DRI of such a quality is less expensive but because the higher level of oxygen present as iron oxide improves the efficiency of the process and results in a higher recovery of iron present as iron oxide and in a faster, carbon boil-assisted heating, melting and refining.

e) The slag basicity can be maintained at a higher level in the process of the present invention, without a corresponding increase in the flux addition, since the quantity of oxides of iron, manganese and silicon, generated during the process is less. A higher slag basicity achieves better phosphorous removal.

f) The cupola is run with a low coke rate and with less expensive metallic raw materials, such as HBI, DRI and scrap, instead of a more expensive metallic raw material, such as pig iron, which is otherwise conventionally used as the main or the only metallic raw material in a cupola. This is done, not merely because such raw materials are less expensive, but more importantly, the use of such raw materials enables one to conveniently produce the molten high carbon ferrous metal with levels of carbon, silicon and manganese which are lower than the conventional metal tapped from a cupola. Also the production of a hot metal with this modified chemistry, results in a lower coke consumption and in a higher productivity of the cupola.

The above discussion brings out the operational differences between the process of the present invention and the other similar processes hitherto known before. However, the operational differences apart, the process of the present invention is based on an approach which differs from those used in previously known processes on three different counts. These differences in the approach are discussed below:

First, in the EAF steel making of Types I and II which have been used thus far, the melting and refining is accelerated by generously blowing gaseous oxygen into the steel bath. As a result, the steel is made under a high oxygen potential. On the other hand, in the process of the present invention, the steel is made under a low oxygen potential and, accordingly, no gaseous oxygen is blown into the bath during melting and refining. This decreases the loss of iron and other expensive alloying elements (whenever present in the steel scrap) as oxides into the slag.

Second, to produce and maintain a foamy slag, both in Type I and Type II processes, carbon monoxide has to be generated continuously and in a large enough quantity. The formation of carbon monoxide is accomplished by the addition of a carburiser and by the blowing of oxygen. The carburiser floats along with the slag phase on the top of the molten metal. Since the gaseous oxygen is blown near the slag/metal interface, the formation of carbon monoxide is localized mainly at the slag/metal interface. On the other hand, in the process of the present invention, the carbon monoxide formation is not localized at the slag/metal interface but occurs throughout the volume of the molten ferrous metal bath producing a very large turbulence in the bath. Also, the carbon boil begins soon after the power is switched on. This promotes rapid carbon removal and accelerated heat transfer between the molten metal bath and slag and also inside the molten metal bath due to forced convection in addition to the usual conduction.

Finally, in both Type I and Type II processes, extensive arcing is required to convert the electrical energy into heat for melting and refining the steel. On the other hand, in the present invention, arcing is avoided. Instead, the process of the present invention uses the resistive heating mainly of the slag and partly of the metallic phase to convert the electrical energy into heat. The heat is therefore, generated mainly and directly in the slag phase. The slag phase is in intimate and direct contact with molten metal because of the extensive carbon boil which occurs throughout the volume of molten metal bath and also during the entire period of melting and refining. As a result, the heat generated in the slag phase is rapidly transferred to the metallic charge in the EAF.

The process of the present invention is characterized by the features that the EAF process, the EAF operation and the chemistry of the molten high carbon ferrous metal used in the EAF all are modified. The invention is also characterized by the feature that the raw materials used to produce this high carbon ferrous metal with a modified chemistry from the metallurgical units such as a cupola (or a blast furnace or the other similar units which produce the high carbon ferrous metal) has to be modified so that such a unit consumes less coke and has a higher productivity. In some instances, such as in a cupola, the production of carbon ferrous metal with the modified chemistry would require very little of an expensive material such as ferroalloys, and less expensive metallic raw materials such as scrap and/or DRI and/or HBI, instead of the more expensive metallic raw material, such as pig iron, which is conventionally and extensively used to produce the standard cast iron in a cupola.

A more distinctive feature of the process of the present invention is that the addition of gaseous oxygen, correspondingly, the addition of carburiser and also arcing are avoided during the EAF steel makinh. Also, in the process of the present invention, the carbon boil occurs during the entire period of melting and refining and also throughout the entire volume of molten metal bath instead of occurring towards the end of melting and instead of being localized only at the slag/metal interface.

What is claimed is:

1. A process for making steel in an electric arc furnace using molten high carbon ferrous metal as a part of a charge mixture, the process comprising the steps of:

a. providing a molten charge which is a melt comprised of a high carbon ferrous metal in the electric arc furnace by one of preparing the melt in the electric arc furnace or introducing the melt into the electric arc furnace, the high carbon ferrous metal comprising less than 3% carbon, less than 0.2% silicon, and less than 0.2% manganese, and the melt having a temperature of at least 1375° C.;

b. adding to the molten charge provided in the electric arc furnace a solid metallic charge comprised of least one material selected from the group consisting of scrap steel, hot briquetted iron, direct reduced iron, and iron ore to provide a charge mixture;

c. refining the charge mixture by melting the charge mixture in the absence of gaseous oxygen to provide a molten steel; and d. superheating, finishing and tapping the molten steel into a ladle for subsequent casting thereof.

2. The process as claimed in claim 1, further comprising preparing the melt in a cupola after which the melt is introduced into the electric arc furnace.

3. The process as claimed in claim 2, wherein coke is added to the high carbon ferrous metal in the cupola, which coke is a low phosphorous, low ash coke.

4. The process as claimed in claim 2, wherein coke rate in the cupola to prepare the melt is lower than that for making conventional molten cast iron in a cupola.

5. The process as claimed in claim 2, wherein the high carbon ferrous metal has a carbon content ranging from 1.5 to 3%.

6. The process as claimed in claim 2, wherein the high carbon ferrous metal has a carbon content ranging from 2 to 3%.

7. The process as claimed in claim 1, further comprising preparing the melt in a furnace selected from the group consisting of a cupola, a blast furnace, and a high carbon ferrous metal furnace; and tapping the furnace while the melt is at a temperature of at least 1425° C.

8. The process as claimed in claim 1, wherein the melt is prepared in the electric arc furnace and heated to a temperature of at least 1375° C.

9. The process as claimed in claim 1, wherein the melt is heated in the electric arc furnace to a temperature ranging from 1375 to 1500° C.

10. The process as claimed in claim 1, wherein the solid metallic charge is comprised of at least one of hot briquetted iron and direct reduced iron, and wherein the at least one of hot briquetted iron and direct reduced iron has at least one characteristic selected from the group consisting of metallization, an oxidized state, and fine particle size which corresponds to a quality which is generally considered undesirable for steel making in an electric arc furnace.

11. The process as claimed in claim 1, wherein a ratio of solid metallic charge and molten charge is preselected so that total carbon present in the charge mixture of step (b) is oxidized to the extent required by oxygen present both as iron oxide in the solid metallic charge and as gaseous oxygen from air which may ingress the electric arc furnace during the process.

12. The process as claimed in claim 1, wherein the molten steel of step (c) has an oxygen content which is lower than a preselected oxygen content, and wherein the process further comprises adjusting the oxygen content of the molten steel during step (d) by at least one of injecting gaseous oxygen into the electric arc furnace or adding iron ore to the electric arc furnace.

13. The process as claimed in claim 1, wherein refining the charge mixture by melting in step (c) generates carbon monoxide substantially throughout the entire volume of the charge mixture and substantially throughout refining duration which promotes heat transfer so that melting and refining are accelerated.

14. The process as claimed in claim 1, wherein refining the charge mixture by heating in step (c) generates slag, and wherein heat for steps (c) and (d) is provided mainly by resistive heating of the slag and not by arcing of the charge mixture and the molten steel.

15. The process as claimed in claim 1, wherein the high carbon ferrous metal has a carbon content ranging from 1.5 to 3%.

16. The process as claimed in claim 1, wherein the high carbon ferrous metal has a carbon content ranging from 2 to 3%.

17. The process as claimed in claim 1, wherein oxygen present in the solid metallic charge so balances the carbon in the molten charge that no gaseous oxygen is required in step (c) yet the melting and refining of the charge mixture is accelerated due to rapid heat transfer produced by turbulence from early onset of carbon boil as the solid metallic charge starts to melt and continuation of turbulence substantially throughout the molten steel as refining continues.

* * * * *